A. G. THOMSON.
PIVOT LAMP ATTACHMENT FOR AUTOMOBILES.
APPLICATION FILED JULY 12, 1909.
1,030,352. Patented June 25, 1912.
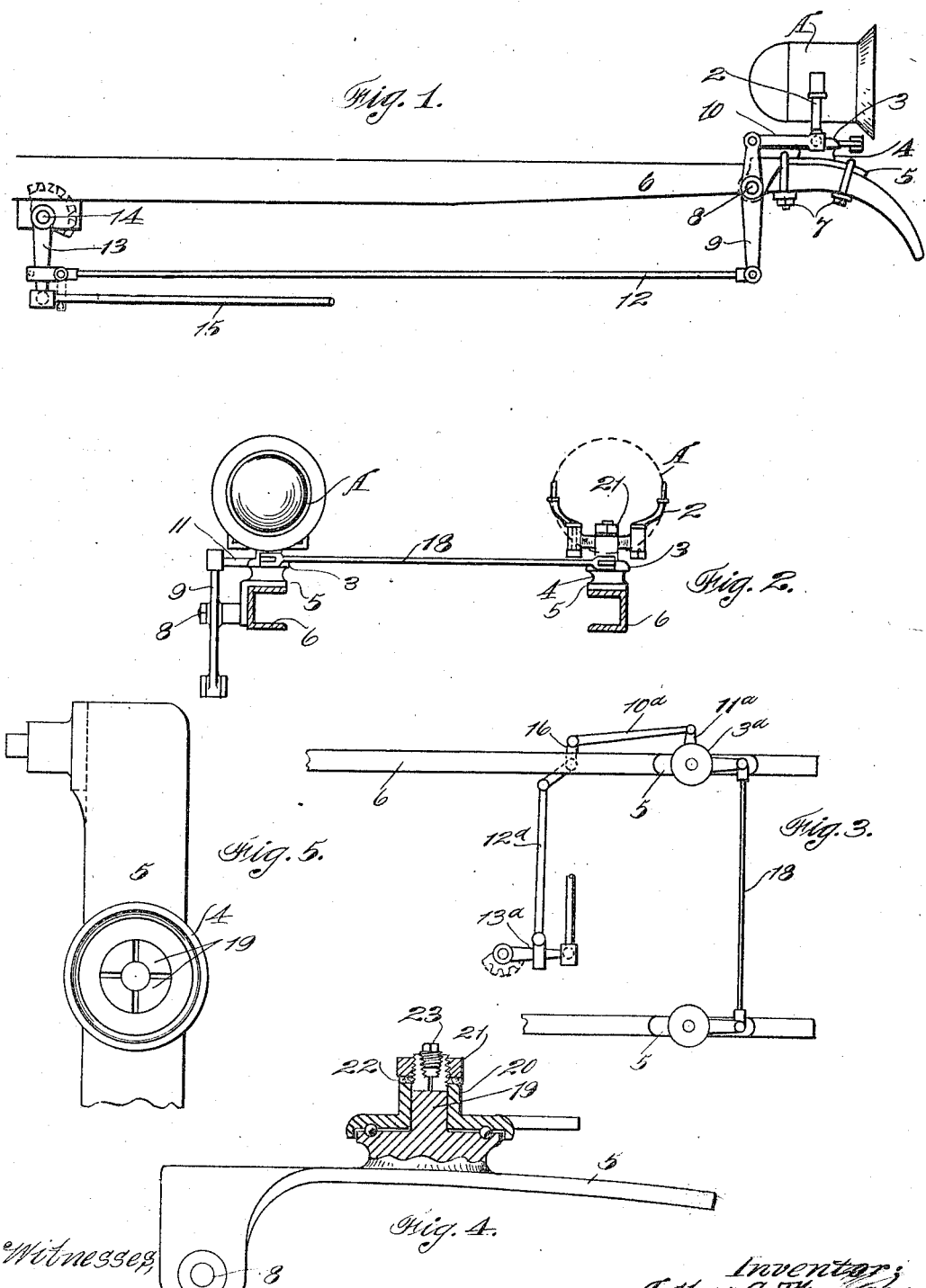

UNITED STATES PATENT OFFICE.

ARTHUR GALE THOMSON, OF SAN FRANCISCO, CALIFORNIA, ASSIGNOR TO PIVOT AUTO LIGHT CO., OF SAN FRANCISCO, CALIFORNIA, A CORPORATION.

PIVOT LAMP ATTACHMENT FOR AUTOMOBILES.

1,030,352.

Specification of Letters Patent.   Patented June 25, 1912.

Application filed July 12, 1909. Serial No. 507,141.

*To all whom it may concern:*

Be it known that I, ARTHUR GALE THOMSON, a citizen of the United States, residing in the city and county of San Francisco and State of California, have invented new and useful Improvements in Pivot Lamp Attachments for Automobiles, of which the following is a specification.

My invention relates to a connection or attachment for automobile lamps whereby the lamp or lamps may be turned in unison with the turning of the front steering-wheel so that the rays of the lamp or lamps will be cast along the road in the actual direction of travel.

My invention consists in a simplified construction and combination of parts whereby the simultaneous movement of the lamp and the turning of the wheels, is effected.

It also comprises details of construction which will be more fully explained by reference to the accompanying drawings, in which—

Figure 1 is a side elevation of a part of the main frame, showing my attachment. Fig. 2 is a front view of a pair of lamps and connected parts. Fig. 3 is a modified form of mechanism. Fig. 4 shows the manner of maintaining the ball-bearing lamp turntable in position. Fig. 5 is a plan view of the locking device.

The lamp or lamps are represented at A, and are mounted upon forks 2, which forks are supported upon a horizontal turntable 3. This turntable has ball-bearing supports upon the base 4, which base is here shown as formed upon a plate 5, which is adapted to be clamped or otherwise secured to the top of the bar 6 of the main frame by fastenings as shown at 7. The rear end of the plate 5 may be turned down, and the downturned end forms a support for the pivot pin 8.

9 is a rocker-arm turntable upon the pivot 8, and the upper end of this arm is connected by a rod 10 with a lever arm 11 which projects from the turntable 3 so that by the oscillations of the rocker-arm 9 and through its connections, the turntable, and with it the lamp, may be caused to swing to one side or the other. The opposite end of the arm 9 is connected by a rod 12 with a crank arm 13 which is fixed to the shaft 14 of the worm-gear of the steering mechanism. To the same arm 13 is connected the rod 15 which extends forwardly and connects with what is known as a "steering knuckle" of the front bearing and steering wheels of the machine. By this construction it will be seen that when the worm-gear is turned by the usual means in either direction, the oscillations of the rocker-arm 13 will be communicated through the two rods 12 and 15 to move these rods simultaneously in the same direction. One of these rods connecting with the knuckle of the front wheel will communicate motion to turn this wheel. The other rod connecting with the rocker-arm 9 will also move the lower end of this rocker-arm in the same direction with the steering knuckle; but the upper end of this rocker-arm moving in the opposite direction will, through the connecting rod 10, act to turn the lamp or lamps A in unison with the movement of the wheel, and thus throw the rays of light in the direction toward which the machine is to travel. The point of attachment or fulcruming of this rocker-arm 9 may be varied somewhat, but is preferably near the front of the machine, and in this manner I avoid carrying the rocker-arm on the worm-gear crank and make the contrivance more compact.

In Fig. 3 I have shown a modification which is adapted to certain forms of steering-gear. In this I have shown a bell-crank lever 16 fulcrumed upon the main frame; one arm of said lever being connected by the rod 12ᵃ with the rock-arm 13ᵃ which is moved in unison with the steering mechanism, and the other arm of the bell-crank lever is connected by a rod 10ᵃ with the arm 11ᵃ which connects with and operates the turntable 3ᵃ.

Where two lamps are employed there will be two turntables, and these two will be connected by a rod as at 18 so that the lamps will be turned in unison.

In order to make a properly rigid and at the same time easily turnable support for the lamps to prevent undue vibration or oscillation, the table or support 4 has a stud or shank 19, and the turntable 3 has a corresponding sleeve 20 which fits over and turns freely upon this shank. The upper part of the shank is split vertically, forming quadrants, and is screw-threaded to receive a nut 21 which, when turned down, seats upon a fiber washer 22 which fits between it and the top of the turntable sleeve 20; thus forming a snug easily turnable joint, without lost motion. In order to lock these parts at any point of adjustment, I have shown a spread plug 23 screw-threaded and fitting corresponding screw-threads in the interior of the slotted extensions of the shank 19 so that when the lock nut 21 is in place, by turning the screw 23 into the top of the shank, the segments of the shank are expanded and the whole locked firmly together.

The lamp supporting forks rise from the edges of the turntable the central sleeve of which turning freely and snugly upon the stud, insures the device against lost motion. The plate 5 is designed to fit upon the main frame 6 of any machine, and is readily secured by clamps.

The base 4 is formed up sufficiently above the surface of the plate 5 for effective clearance of the moving parts, and need have no diameter greater than the width of the plate, as the vertical stud and sleeve of the turntable insure the requisite rigidity and steadiness.

Having thus described my invention, what I claim and desire to secure by Letters Patent is—

1. The combination with an automobile frame, of an independent lamp supporting member, means for securing said member upon the front of the frame, a turn-table carried by said member, a lamp supported by and turnable with said table, steering mechanism having a crank arm connected with the steering knuckles of the front bearing-wheels, and connections between said crank-arm and the lamp turn-table, said connections including a vertical lever fulcrumed between its ends on the part of the vehicle which carries the lamp supporting member.

2. An attachment for an automobile frame, said attachment consisting of an independent plate having formed upon it a lamp turn-table base, means whereby it may be detachably secured to the frame, a lamp on said turn-table base, steering mechanism, said plate having an integrally formed downwardly extending projection, a horizontally projecting arbor on said projection, a lever fulcrumed between its ends on said arbor and articulated connections with the opposite ends of said lever for actuating the lamp.

3. An attachment for automobile frames, said attachment consisting of a detachable plate and a base, and the lamp carrying turntable mounted thereon, means for detachably securing said plate to the frame, a support carried by the plate, a rocker-arm pivoted to said support intermediate of its ends, connections between one of its ends and the lamp turntable, and a steering-gear crank with which the opposite end is connected.

4. In an operating mechanism for automobile lamps, a bell-crank lever connected to one of said lamps, a crank arm connected to the other lamp, a connecting rod to operatively connect said crank arm to one arm of said bell crank lever, a bell crank operating lever pivotally mounted on the frame of the machine, an operating rod to connect one arm of said lever with the free arm of the bell crank lever on said lamp, and an operating rod loosely connected at one end to the free end of the bell crank lever on said frame and at its opposite end to a part of the steering mechanism of the automobile.

5. In an operating mechanism for automobile lamps, and in combination with an automobile having the usual steering wheels and steering mechanism, a lamp mounted on the vehicle to turn about a vertical pivot, a crank arm connected to the lamp, a rod extending from the crank arm in the direction of the steering mechanism, direction changing means mounted on the vehicle body and connected with said rod, and other connections between said direction changing means and the steering mechanism.

In testimony whereof I have hereunto set my hand in the presence of two subscribing witnesses.

ARTHUR GALE THOMSON.

Witnesses:
E. G. BLASDEL,
J. C. BRODIE.

Copies of this patent may be obtained for five cents each, by addressing the "Commissioner of Patents, Washington, D. C."